United States Patent
Kawakami et al.

(10) Patent No.: US 11,465,712 B2
(45) Date of Patent: Oct. 11, 2022

(54) CONTROL APPARATUS, CONTROL SYSTEM, AND ELECTRIC COMPONENT FOR HUMAN-POWERED VEHICLE

(71) Applicant: SHIMANO INC., Sakai (JP)

(72) Inventors: Kenta Kawakami, Sakai (JP); Mao Kuroda, Sakai (JP); Toshio Tetsuka, Sakai (JP); Yoshiyuki Kasai, Sakai (JP)

(73) Assignee: SHIMANO INC., Sakai (JP)

( * ) Notice: Subject to any disclaimer, the term of this patent is extended or adjusted under 35 U.S.C. 154(b) by 459 days.

(21) Appl. No.: 16/551,669

(22) Filed: Aug. 26, 2019

(65) Prior Publication Data

US 2021/0061412 A1 Mar. 4, 2021

(51) Int. Cl.
*B62M 25/08* (2006.01)
*B62M 6/50* (2010.01)
*B62K 23/02* (2006.01)

(52) U.S. Cl.
CPC ............. *B62M 25/08* (2013.01); *B62K 23/02* (2013.01); *B62M 6/50* (2013.01)

(58) Field of Classification Search
CPC ........ B62M 25/08; B62M 6/50; B62M 9/122; B62M 9/132; B62K 23/02; B62K 25/04; B62J 2001/085
See application file for complete search history.

(56) References Cited

U.S. PATENT DOCUMENTS

| 8,909,424 | B2 | 12/2014 | Jordan et al. | |
| 10,858,063 | B2* | 12/2020 | Komatsu | B62L 3/023 |
| 10,894,578 | B2* | 1/2021 | Cahan | B62K 23/06 |
| 10,940,909 | B2* | 3/2021 | Masuda | B62J 45/20 |
| 10,988,209 | B1* | 4/2021 | Luman | B62L 3/023 |
| 11,027,709 | B2* | 6/2021 | Komatsu | B60T 7/085 |
| 11,180,219 | B2* | 11/2021 | Shipman | B62K 23/06 |
| 2008/0070501 | A1 | 3/2008 | Wyld | |
| 2018/0043968 | A1* | 2/2018 | Sala | B62M 9/122 |
| 2018/0115860 | A1* | 4/2018 | Masuda | B62M 6/55 |

FOREIGN PATENT DOCUMENTS

DE 10 2017 218 168 4/2018

* cited by examiner

*Primary Examiner* — Richard M Camby
(74) *Attorney, Agent, or Firm* — Mori & Ward, LLP

(57) ABSTRACT

A control apparatus for a human-powered vehicle comprises a first controller. The first controller is configured to establish, in response to a user input, a wireless communication channel between a first wireless communicator of a first communication device and a second wireless communicator of a second communication device via a wired communication channel which is established between the first communication device and the second communication device through an electric cable and a first communication port configured to be connected to the electric cable.

21 Claims, 12 Drawing Sheets

CONTROL APPARATUS, CONTROL SYSTEM, AND ELECTRIC COMPONENT FOR HUMAN-POWERED VEHICLE

BACKGROUND OF THE INVENTION

Field of the Invention

The present invention relates to a control apparatus, a control system, and an electric component for a human-powered vehicle.

Discussion of the Background

A human-powered vehicle includes a wireless communication unit configured to wirelessly communicate with another wireless communication unit.

SUMMARY OF THE INVENTION

In accordance with a first aspect of the present invention, a control apparatus for a human-powered vehicle comprises a first controller. The first controller is configured to establish, in response to a user input, a wireless communication channel between a first wireless communicator of a first communication device and a second wireless communicator of a second communication device via a wired communication channel which is established between the first communication device and the second communication device through an electric cable and a first communication port configured to be connected to the electric cable.

With the control apparatus according to the first aspect, it is possible to execute pairing between the first wireless communicator and the second wireless communicator via the wired communication channel in response to the user input. Thus, it is possible to reliably execute pairing between the first wireless communicator and the second wireless communicator without cross talk.

In accordance with a second aspect of the present invention, the control apparatus according to the first aspect further comprises a first electric power source configured to be detachably connected to the first controller, the first electric power source being configured to supply electricity to the first controller.

With the control apparatus according to the second aspect, it is possible to utilize the first electric power source to execute pairing between the first wireless communicator and the second wireless communicator.

In accordance with a third aspect of the present invention, the control apparatus according to the first or second aspect further comprises a first detector configured to detect a connection between the electric cable and the first communication port. The first controller is configured to establish the wireless communication channel via the wired communication channel in response to the user input after the first detector detects the connection between the electric cable and the first communication port.

With the control apparatus according to the third aspect, it is possible to reliably execute pairing between the first wireless communicator and the second wireless communicator using a detection result of the first detector.

In accordance with a fourth aspect of the present invention, a control apparatus for a human-powered vehicle comprises a first controller and a first electric power source. The first controller is configured to establish a wireless communication channel between a first wireless communicator of a first communication device and a second wireless communicator of a second communication device via a wired communication channel which is established between the first communication device and the second communication device through an electric cable and a first communication port configured to be connected to the electric cable. The first electric power source is configured to be detachably connected to the first controller. The first electric power source is configured to supply electricity to the first controller.

With the control apparatus according to the fourth aspect, it is possible to execute pairing between the first wireless communicator and the second wireless communicator via the wired communication channel. Furthermore, it is possible to utilize the first electric power source to execute pairing between the first wireless communicator and the second wireless communicator. Thus, it is possible to reliably execute pairing between the first wireless communicator and the second wireless communicator without cross talk.

In accordance with a fifth aspect of the present invention, the control apparatus according to the fourth aspect further comprises a first detector configured to detect a connection between the electric cable and the first communication port. The first controller is configured to establish the wireless communication channel via the wired communication channel in response to a detection result of the first detector that the electric cable is connected to the first communication port.

With the control apparatus according to the fifth aspect, it is possible to reliably execute pairing between the first wireless communicator and the second wireless communicator using a detection result of the first detector.

In accordance with a sixth aspect of the present invention, the control apparatus according to any one of the first to fifth aspects is configured so that the first controller is configured to transmit first information relating to the first wireless communicator via the wired communication channel.

With the control apparatus according to the sixth aspect, it is possible to reliably execute pairing between the first wireless communicator and the second wireless communicator using the first information.

In accordance with a seventh aspect of the present invention, the control apparatus according to the sixth aspect is configured so that the first controller includes a first memory configured to store the first information. The first controller is configured to transmit the first information stored in the first memory.

With the control apparatus according to the seventh aspect, it is possible to reliably execute pairing between the first wireless communicator and the second wireless communicator using the first information stored in the first memory.

In accordance with an eighth aspect of the present invention, the control apparatus according to the seventh aspect is configured so that the first controller is configured to receive second information relating to the second wireless communicator via the wired communication channel. The first controller is configured to control the first memory to store the second information if the first controller receives the second information.

With the control apparatus according to the eighth aspect, the first controller can recognize the second information relating to the second wireless communicator as information of a paired component.

In accordance with a ninth aspect of the present invention, the control apparatus according to any one of the first to eighth aspects is configured so that the first controller is configured to control the first wireless communicator to wirelessly transmit a control signal to the second wireless communicator via the wireless communication channel. The control signal includes a command to control an actuator to move a movable member.

With the control apparatus according to the ninth aspect, it is possible to operate another component including the second wireless communicator using the first wireless communicator and the second wireless communicator.

In accordance with a tenth aspect of the present invention, the control apparatus according to any one of the first to eighth aspects is configured so that the first wireless communicator is configured to wirelessly receive a control signal from the second wireless communicator via the wireless communication channel. The control signal includes a command to control an actuator to move a movable member.

With the control apparatus according to the tenth aspect, it is possible to operate another component including the first wireless communicator using the first wireless communicator and the second wireless communicator.

In accordance with an eleventh aspect of the present invention, the control apparatus according to the ninth or tenth aspect is configured so that the control signal includes information relating to at least one of the first wireless communicator and the second wireless communicator.

With the control apparatus according to the eleventh aspect, one of the first wireless communicator and the second wireless communicator can recognize the other of the first wireless communicator and the second wireless communicator.

In accordance with a twelfth aspect of the present invention, the control apparatus according to any one of the first to eleventh aspects further comprises the first communication device and a first housing. The first communication device including the first wireless communicator and the first communication port. The first controller and the first communication device are configured to be arranged in the first housing.

With the control apparatus according to the twelfth aspect, it is possible to protect the first controller and the first communication device.

In accordance with a thirteenth aspect of the present invention, a control system for a human-powered vehicle comprises the control apparatus according to any one of the first to third aspects and an additional control apparatus. The additional control apparatus includes the second communication device. The second communication device includes the second wireless communicator and a second communication port configured to be connected to the electric cable. The additional control apparatus includes a second controller configured to establish the wireless communication channel between the first communication device and the second communication device via the wired communication channel in response to the user input.

With the control apparatus according to the thirteenth aspect, it is possible to execute pairing between the first wireless communicator and the second wireless communicator via the wired communication channel in response to the user input. Thus, it is possible to reliably execute pairing between the first wireless communicator and the second wireless communicator without cross talk.

In accordance with a fourteenth aspect of the present invention, the control apparatus according to the thirteenth aspect is configured so that the additional control apparatus comprises a second electric power source configured to be detachably connected to the second controller. The second electric power source is configured to supply electricity to the second controller.

With the control apparatus according to the fourteenth aspect, it is possible to utilize the second electric power source to execute pairing between the first wireless communicator and the second wireless communicator.

In accordance with a fifteenth aspect of the present invention, the control apparatus according to the thirteenth or fourteenth aspect is configured so that the second controller is configured to transmit second information relating to the second wireless communicator via the wired communication channel.

With the control apparatus according to the fifteenth aspect, it is possible to reliably execute pairing between the first wireless communicator and the second wireless communicator using the second information.

In accordance with a sixteenth aspect of the present invention, the control apparatus according to the fifteenth aspect is configured so that the second controller includes a second memory configured to store the second information. The second controller is configured to transmit the second information stored in the second memory.

With the control apparatus according to the sixteenth aspect, it is possible to reliably execute pairing between the first wireless communicator and the second wireless communicator using the second information stored in the second memory.

In accordance with a seventeenth aspect of the present invention, the control apparatus according to the sixteenth aspect is configured so that the second controller is configured to receive the first information relating to the first wireless communicator via the wired communication channel. The second controller is configured to control the second memory to store the first information if the second controller receives the first information.

With the control apparatus according to the seventeenth aspect, the second controller can recognize the first information relating to the first wireless communicator as information of a paired component.

In accordance with an eighteenth aspect of the present invention, the control apparatus according to any one of the thirteenth to seventeenth aspects is configured so that the additional control apparatus includes the second communication device and a second housing. The second controller and the second communication device are configured to be arranged in the second housing.

With the control apparatus according to the eighteenth aspect, it is possible to protect the second controller and the second communication device.

In accordance with a nineteenth aspect of the present invention, the control apparatus according to any one of the thirteenth to eighteenth aspects is configured so that the first controller is configured to control the first wireless communicator to wirelessly transmit a control signal to the second wireless communicator via the wireless communication channel. The second controller is configured to control the second wireless communicator to receive the control signal via the wireless communication channel. The control signal includes a command to control an actuator to move a movable member.

With the control apparatus according to the nineteenth aspect, it is possible to operate the actuator using the control apparatus and the additional control apparatus.

In accordance with a twentieth aspect of the present invention, an electric component for a human-powered vehicle comprises one of an operating device, a gear changing device, a braking device, a suspension, an adjustable seatpost, an auxiliary drive device, a lighting device, an imaging device, and a notification device and the control apparatus according to any one of the first to twelfth aspects. The control apparatus is arranged on the one of the operating device, the gear changing device, the braking device, the suspension, the adjustable seatpost, the auxiliary drive device, the lighting device, the imaging device, and the notification device.

With the control apparatus according to the twentieth aspect, it is possible to operate several kinds of components using the control apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
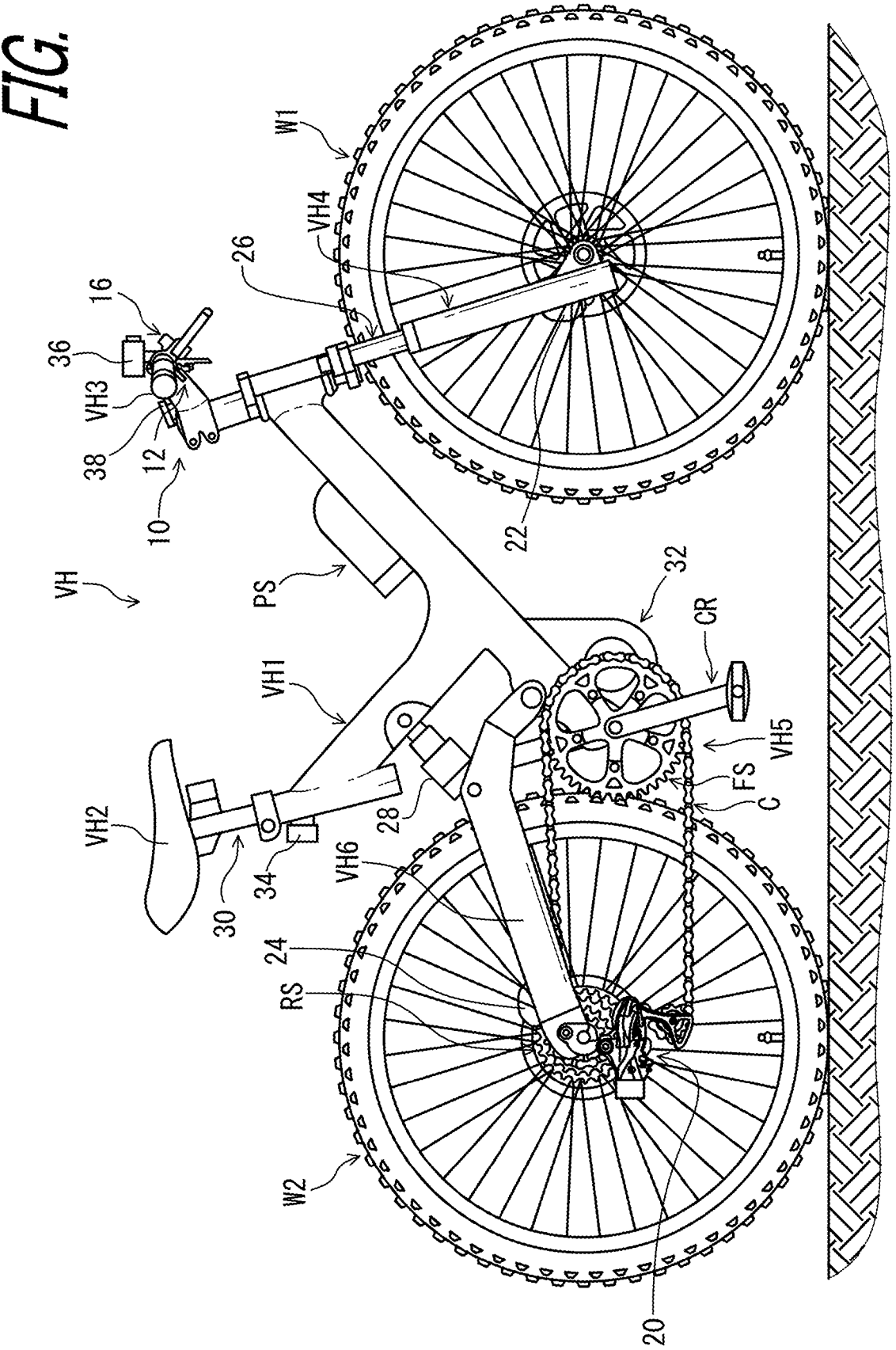
FIG. 1 is a side elevational view of a human-powered vehicle including a control system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes a control system 10 in accordance with a first embodiment. For example, the human-powered vehicle VH is a vehicle to travel with a motive power including at least a human power of a user who rides the human-powered vehicle VH (i.e., rider). The human-powered vehicle VII has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. Examples of the human-powered vehicle VII include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VII can be an E-bike. While the human-powered vehicle VII is illustrated as a mountain bike, the control system 10 can be applied to road bikes, time trial bikes or any type of human-powered vehicles.

The human-powered vehicle VH further includes a vehicle body VH1, a saddle VH2, a handlebar VH3, a front fork VH4, a drive train VH5, a rear swing arm VH6, a first wheel W1, and a second wheel W2. The front fork VH4 is rotatably mounted to the vehicle body VH1. The handlebar VH3 is secured to the front fork VH4. The rear swing arm VH6 is pivotally coupled to the vehicle body VH1. The first wheel W1 is rotatably coupled to the front fork VH4. The second wheel W2 is rotatably coupled to the rear swing arm VH6.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the handlebar VH3. Accordingly, these terms, as utilized to describe the control system 10 or other components, should be interpreted relative to the human-powered vehicle VH equipped with the control system 10 as used in an upright riding position on a horizontal surface.

The drive train VH5 includes a crank assembly CR, a front sprocket FS, a rear sprocket assembly RS, and a chain C. The front sprocket FS is mounted to the crank assembly CR. The rear sprocket assembly RS is rotatably mounted to the vehicle body VH1 and includes a plurality of rear sprockets. The chain C is engaged with the front sprocket FS and the rear sprocket assembly RS.

Figure 2:
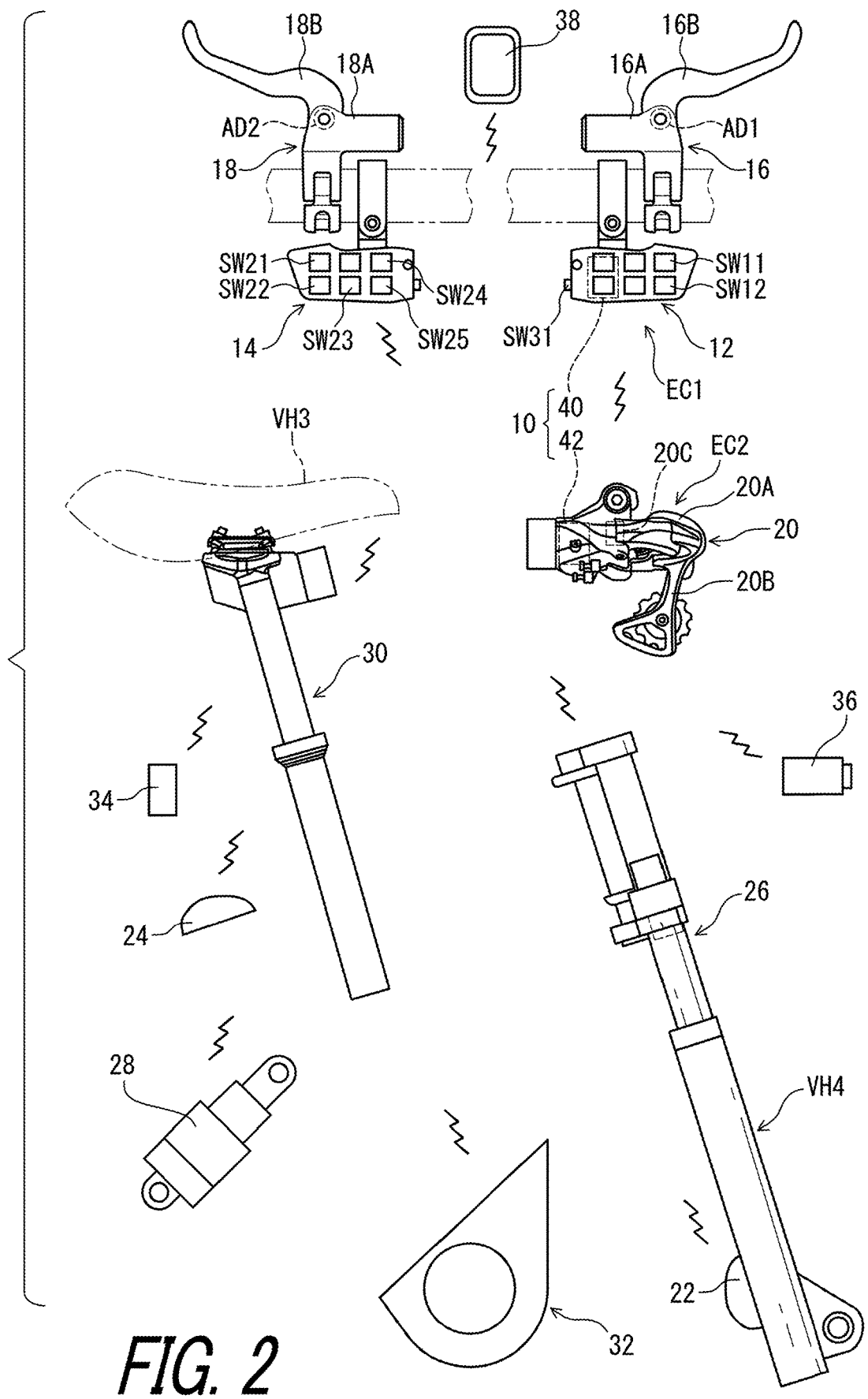
FIG. 2 is a schematic diagram of the human-powered vehicle illustrated in FIG. 1.

As seen in FIGS. 1 and 2, the human-powered vehicle VH includes an operating device 12, an operating device 14, an operating device 16, an operating device 18, a gear changing device 20, a braking device 22, a braking device 24, a suspension 26, a suspension 28, an adjustable seatpost 30, an auxiliary drive device 32, a lighting device 34, an imaging device 36, and a notification device 38.

The operating device 12 is configured to operate the gear changing device 20 in response to a user operation input. The operating device 14 is configured to operate each of the suspension 26, the suspension 28, the adjustable seatpost 30, the auxiliary drive device 32, and the imaging device 36 in response to a user operation input. The operating device 16 is configured to operate the braking device 22 in response to a user braking input. The operating device 18 is configured to operate the braking device 24 in response to a user braking input.

As seen in FIG. 1, the gear changing device 20 is configured to change a gear position of the drive train VH5. The gear changing device 20 is mounted to the vehicle body VH1 and is configured to shift the chain C relative to the rear sprocket assembly RS to change the gear position of the drive train VH5.

The braking device 22 is configured to apply a braking force to the first wheel W1. The braking device 24 is configured to apply a braking force to the second wheel W2.

The suspension 26 is configured to effectively absorb shock and provide stability on rough surfaces. The suspension 28 is configured to effectively absorb shock and provide stability on rough surfaces. The suspension 26 is attached to the front fork VH4. The suspension 28 is coupled to the vehicle body VH1 and the rear swing arm VH6.

The adjustable seatpost 30 is configured to change a height of the saddle VH2 relative to the vehicle body VH1. The adjustable seatpost 30 is attached to the vehicle body VH1. The saddle VH2 is attached to the adjustable seatpost 30. The auxiliary drive device 32 is configured to apply an assist driving force to the drive train VH5. The auxiliary drive device 32 is mounted to the vehicle body VH1.

The lighting device 34 is configured to emit light. Examples of lighting device 34 include a brake light and a headlight. In this embodiment, the lighting device 34 is configured to emit light when at least one of the braking device 22 and the braking device 24 operates. However, the lighting device 34 is not limited to this embodiment. The imaging device 36 is configured to capture images and is mounted to the handlebar VH3. Examples of the imaging device 36 include a camera. The notification device 38 is configured to output information relating to the human-powered vehicle VH and is mounted to the handlebar VH3. Examples of the notification device 38 include a cycle computer, a smartphone, and a tablet computer.

As seen in FIG. 2, the operating device 12 includes electrical switches SW11 and SW12. The electrical switch SW11 is configured to receive a user operation input U11. The electrical switch SW12 is configured to receive a user operation input U12. In this embodiment, the user operation input U11 indicates upshifting of the gear changing device 20. The user operation input U12 indicates downshifting of the gear changing device 20. The operating device 12 is configured to wirelessly communicate with the gear changing device 20.

The operating device 14 includes electrical switches SW21, SW22, SW23, SW24 and SW25. The electrical switch SW21 is configured to operate the suspension 26 to switch a speed of compression of the suspension 26 and/or switch of a stroke of compression of the suspension 26. The electrical switch SW22 is configured to operate the suspension 28 to switch a speed of compression of the suspension 28 and/or switch a stroke of compression of the suspension 28. The electrical switch SW23 is configured to operate the adjustable seatpost 30 to change a state of the adjustable seatpost 30 between a locked state and a adjustable state. The electrical switch SW24 is configured to operate the auxiliary drive device 32 to increase an assist ratio of the auxiliary drive device 32. The electrical switch SW25 is configured to operate the auxiliary drive device 32 to decrease the assist ratio of the auxiliary drive device 32.

The operating device 14 is configured to wirelessly communicate with the suspension 26, the suspension 28, the adjustable seatpost 30, the auxiliary drive device 32, and the imaging device 36. The operating device 16 is configured to wirelessly communicate with the braking device 22 and the lighting device 34. The operating device 18 is configured to wirelessly communicate with the braking device 24 and the lighting device 34. The notification device 38 is configured to wirelessly communicate with the gear changing device 20 and the auxiliary drive device 32.

The operating device 16 includes a base part 16A, an operating member 16B, and an actuation detector AD1. The base part 16A is configured to be mounted to the handlebar VH3. The operating member 16B is pivotally coupled to the base part 16A. The actuation detector AD1 configured to detect an angle of a pivotal movement of the operating member 16B relative to the base part 16A. The operating device 16 and the braking device 22 are configured to wirelessly communicate with each other.

The operating device 18 includes a base part 18A, an operating member 18B, and an actuation detector AD2. The base part 18A is configured to be mounted to the handlebar VH3. The operating member 18B is pivotally coupled to the base part 18A. The actuation detector AD2 configured to detect an angle of a pivotal movement of the operating member 18B relative to the base part 18A. The operating device 18 and the braking device 24 are configured to wirelessly communicate with each other.

As seen in FIG. 2, the gear changing device 20 includes a base member 20A, a movable member 20B, and an actuator 20C. The base member 20A is mounted to the vehicle body VH1 (see, e.g., FIG. 1). The movable member 20B is configured to guide the chain C (see, e.g., FIG. 1). The movable member 20B is movably coupled to the base member 20A and is configured to engage with the chain C when shifting the chain C relative to the rear sprocket assembly RS. The actuator 20C is configured to move the movable member 20B relative to the base member 20A to shift the chain C relative to the rear sprocket assembly RS. Examples of the actuator 20C include a direct current motor and a stepper motor.

The human-powered vehicle VH includes an electric component EC1. The electric component EC1 for the human-powered vehicle VH comprises one of the operating device 12, 14, 16 and/or 18, the gear changing device 20, the braking device 22 and/or 24, the suspension 26 and/or 28, the adjustable seatpost 30, the auxiliary drive device 32, the lighting device 34, the imaging device 36, and the notification device 38. In this embodiment, the electric component EC1 comprises the operating device 12. However, the electric component EC1 can comprise another of the operating device 14, 16 and/or 18, the gear changing device 20, the braking device 22 and/or 24, the suspension 26 and/or 28, the adjustable seatpost 30, the auxiliary drive device 32, the lighting device 34, the imaging device 36, and the notification device 38.

The human-powered vehicle VH includes an additional electric component EC2. The additional electric component EC2 for the human-powered vehicle VH comprises another of the operating device 12, 14, 16 and/or 18, the gear changing device 20, the braking device 22 and/or 24, the suspension 26 and/or 28, the adjustable seatpost 30, the auxiliary drive device 32, the lighting device 34, the imaging device 36, and the notification device 38. In this embodiment, the additional electric component EC2 comprises the gear changing device 20. However, the additional electric component EC2 can comprise another of the operating device 12, 14, 16 and/or 18, the braking device 22 and/or 24, the suspension 26 and/or 28, the adjustable seatpost 30, the auxiliary drive device 32, the lighting device 34, the imaging device 36, and the notification device 38.

The control system 10 for the human-powered vehicle VH comprises a control apparatus 40 and an additional control apparatus 42. In this embodiment, the electric component EC1 for the human-powered vehicle VH comprises the control apparatus 40. The additional electric component EC2 for the human-powered vehicle VH comprises the additional control apparatus 42.

The control apparatus 40 is arranged on the one of the operating device 12, 14, 16 and/or 18, the gear changing device 20, the braking device 22 and/or 24, the suspension 26 and/or 28, the adjustable seatpost 30, the auxiliary drive device 32, the lighting device 34, the imaging device 36, and the notification device 38. In this embodiment, the control apparatus 40 is arranged on the operating device 12. However, the control apparatus 40 is arranged on another of the operating device 14, 12 and/or 13, the gear changing device 20, the braking device 22 and/or 24, the suspension 26 and/or 28, the adjustable seatpost 30, the auxiliary drive device 32, the lighting device 34, the imaging device 36, and the notification device 38.

The additional control apparatus 42 is arranged on another of the operating device 12, 14, 16 and/or 18, the gear changing device 20, the braking device 22 and/or 24, the suspension 26 and/or 28, the adjustable seatpost 30, the auxiliary drive device 32, the lighting device 34, the imaging device 36, and the notification device 38. In this embodiment, the additional control apparatus 42 is arranged on the gear changing device 20. However, the additional control apparatus 42 is arranged on another of the operating device 12, 14, 16 and/or 18, the braking device 22 and/or 24, the suspension 26 and/or 28, the adjustable seatpost 30, the auxiliary drive device 32, the lighting device 34, the imaging device 36, and the notification device 38.

Figure 3:
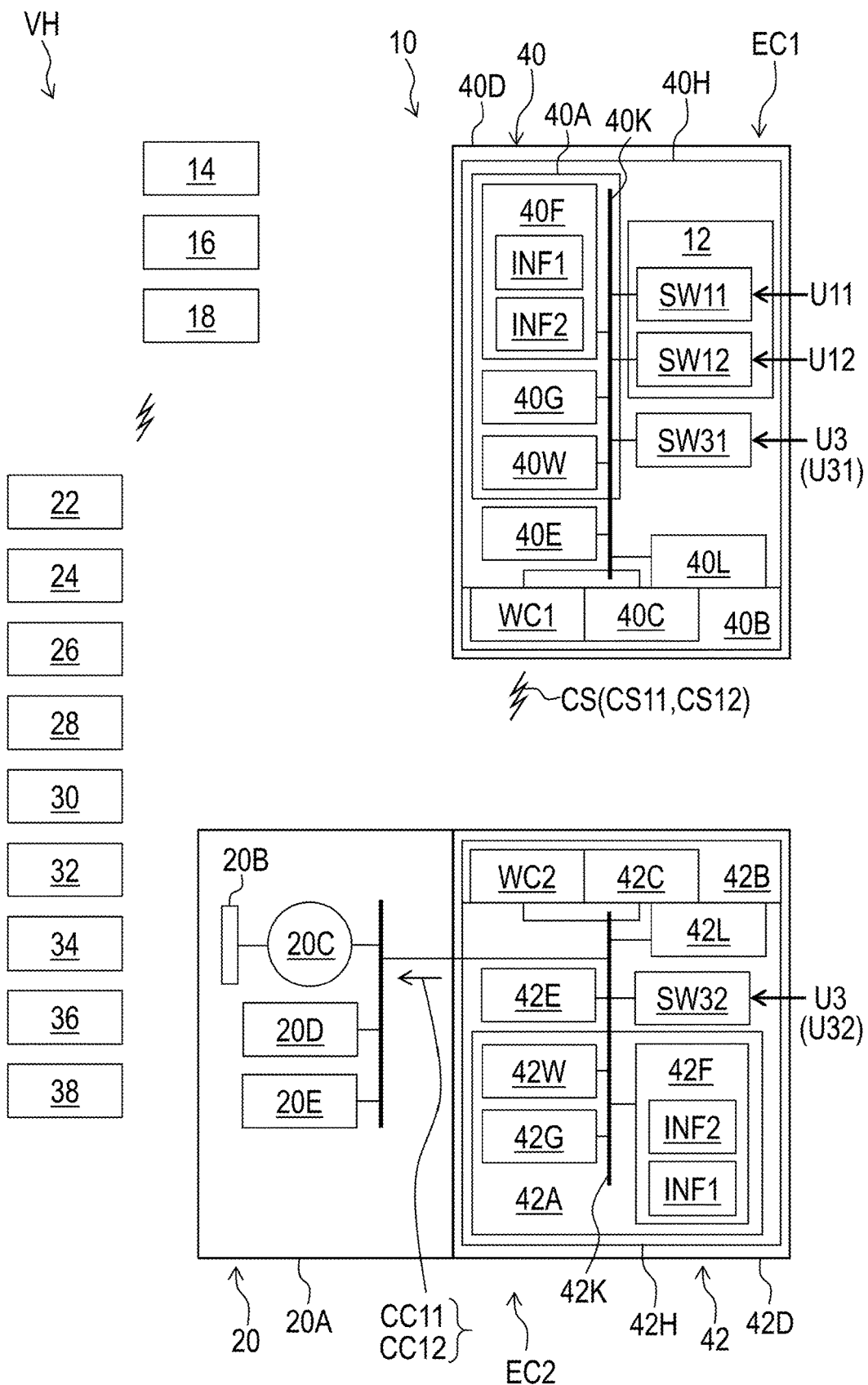
FIG. 3 is a schematic block diagram of the human-powered vehicle illustrated in FIG. 1.

As seen in FIG. 3, the control apparatus 40 for the human-powered vehicle VH comprises a first controller 40A. The control apparatus 40 further comprises a first communication device 40B. The first communication device 40B includes a first wireless communicator WC1 and a first communication port 40C. The first wireless communicator WC1 is configured to wirelessly communicate with another wireless communicator. The first communication port 40C is configured to be connected to an electric cable 44. In this embodiment, the first communication port 40C is configured to be connected to the electric cable 44 to be detachable from the electric cable 44 without substantial damage. The control apparatus 40 further comprises a first housing 40D. The first controller 40A and the first communication device 40B are configured to be arranged in the first housing 40D. However, the arrangement of the first controller 40A and the first communication device 40B is not limited to this embodiment.

The first wireless communicator WC1 includes a signal transmitting circuit, a signal receiving circuit, and an antenna. Thus, the first wireless communicator WC1 can also be referred to as a first wireless communication circuit WC1.

The first wireless communicator WC1 is configured to superimpose digital signals on carrier wave using a predetermined wireless communication protocol to wirelessly transmit the digital signal. In this embodiment, the first wireless communicator WC1 is configured to encrypt signals using a cryptographic key to generate encrypted wireless signals.

The first wireless communicator WC1 is configured to receives a wireless signal via the antenna. In this embodiment, the first wireless communicator WC1 is configured to decode the wireless signal to recognize signals and/or information wirelessly transmitted from another wireless communicator. The first wireless communicator WC1 is configured to decrypt the wireless signal using the cryptographic key.

The control apparatus 40 further comprises a first electric power source 40E. The first electric power source 40E is configured to be detachably connected to the first controller 40A. The first electric power source 40E is configured to supply electricity to the first controller 40A. The first electric power source 40E is configured to supply electricity to the first controller 40A and the first communication device 40B.

The first controller 40A includes a first memory 40F. The first memory 40F is configured to store first information INF1 relating to the first wireless communicator WC1. The first wireless communicator WC1 has unique device identification (ID) assigned to the first wireless communicator WC1. The first information INF1 includes a first device ID that is the unique device ID of the first wireless communicator WC1. In this embodiment, the first device ID is also unique device ID assigned to the operating device 12 since the first wireless communicator WC1 is mounted to the operating device 12. Namely, the first information INF1 includes the first device ID indicating the first wireless communicator WC1 and the operating device 12.

The first controller 40A includes a first processor 40G, a first circuit board 40H, and a first system bus 40K. The first processor 40G and the first memory 40F are electrically mounted on the first circuit board 40H. The first processor 40G includes a central processing unit (CPU) and a memory controller. The first memory 40F is electrically connected to the first processor 40G. The first memory 40F includes a read only memory (ROM) and a random-access memory (RAM). The first memory 40F includes storage areas each having an address in the ROM and the RAM. The first processor 40G is configured to control the first memory 40F to store data in the storage areas of the first memory 40F and reads data from the storage areas of the first memory 40F. The first memory 40F (e.g., the ROM) stores a program. The program is read into the first processor 40G, and thereby the configuration and/or algorithm of the first controller 40A is performed.

The additional control apparatus 42 includes a second controller 42A. The additional control apparatus 42 includes a second communication device 42B. The second communication device 42B includes a second wireless communicator WC2 and a second communication port 42C. The second wireless communicator WC2 is configured to wirelessly communicate with another wireless communicator. The second communication port 42C is configured to be connected to the electric cable 44. In this embodiment, the second communication port 42C is configured to be connected to the electric cable 44 to be detachable from the electric cable 44 without substantial damage. The additional control apparatus 42 includes a second housing 42D. The second controller 42A and the second communication device 42B are configured to be arranged in the second housing 42D. However, the arrangement of the second controller 42A and the second communication device 42B is not limited to this embodiment.

The second wireless communicator WC2 includes a signal transmitting circuit, a signal receiving circuit, and an antenna. Thus, the second wireless communicator WC2 can also be referred to as a second wireless communication circuit WC2.

The second wireless communicator WC2 is configured to superimpose digital signals on carrier wave using a predetermined wireless communication protocol to wirelessly transmit the digital signal. In this embodiment, the second wireless communicator WC2 is configured to encrypt signals using a cryptographic key to generate encrypted wireless signals.

The second wireless communicator WC2 is configured to receives a wireless signal via the antenna. In this embodiment, the second wireless communicator WC2 is configured to decode the wireless signal to recognize signals and/or information wirelessly transmitted from another wireless communicator. The second wireless communicator WC2 is configured to decrypt the wireless signal using the cryptographic key.

Each of the operating devices 14, 16, and 18, the braking devices 22 and 24, the suspension 26 and 28, the adjustable seatpost 30, the auxiliary drive device 32, the lighting device 34, the imaging device 36, and the notification device 38 include a wireless communicator having substantially the same structure as the structures of the first wireless communicator WC1 and the second wireless communicator WC2.

The additional control apparatus 42 comprises a second electric power source 42E configured to be detachably connected to the second controller 42A. The second electric power source 42E is configured to supply electricity to the second controller 42A. The second electric power source 42E is configured to supply electricity to the second controller 42A and the second communication device 42B.

The second controller 42A includes a second memory 42F. The second memory 42F is configured to store second information INF2 relating to the second wireless communicator WC2. The second wireless communicator WC2 has unique device ID assigned to the second wireless communicator WC2. The second information INF2 includes a second device ID that is the unique device ID of the second wireless communicator WC2. In this embodiment, the second device ID is also unique device ID assigned to the gear changing device 20 since the second wireless communicator WC2 is mounted to the gear changing device 20. Namely, the second information INF2 includes the second device ID indicating the second wireless communicator WC2 and the gear changing device 20.

The second controller 42A includes a second processor 42G, a second circuit board 42H, and a second system bus 42K. The second processor 42G and the second memory 42F are electrically mounted on the second circuit board 42H. The second processor 42G includes a CPU and a memory controller. The second memory 42F is electrically connected to the second processor 42G. The actuator 20C of the gear changing device 20 is electrically connected to the second system bus 42K. The second memory 42F includes a ROM and a RAM. The second memory 42F includes storage areas each having an address in the ROM and the RAM. The second processor 42G is configured to control the second memory 42F to store data in the storage areas of the second memory 42F and reads data from the storage areas of the second memory 42F. The second memory 42F (e.g., the ROM) stores a program. The program is read into the second processor 42G, and thereby the configuration and/or algorithm of the second controller 42A is performed.

The operating device 12 and the gear changing device 20 are configured to wirelessly communicate with each other using the first wireless communicator WC1 and the second wireless communicator WC2. Each of the first wireless communicator WC1 and the second wireless communicator WC2 has a wired pairing mode. In the wired pairing mode, the first wireless communicator WC1 and the second wireless communicator WC2 are configured to exchange the unique device ID via a wired communication channel and to establish a wireless communication channel.

Figure 4:
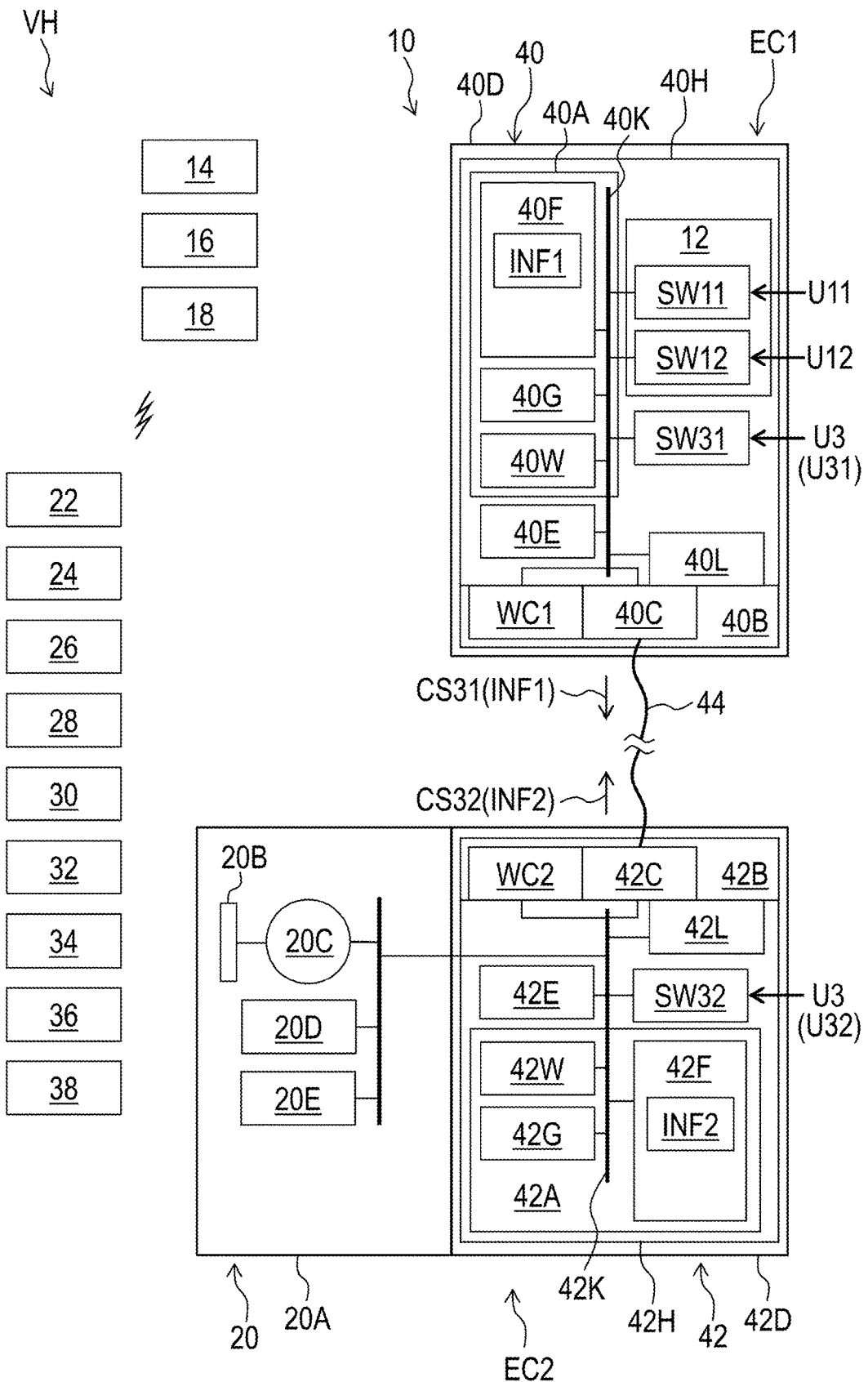
FIG. 4 is a schematic block diagram of the human-powered vehicle illustrated in FIG. 1 (during pairing).

As seen in FIG. 4, the first controller 40A is configured to establish the wireless communication channel between the first wireless communicator WC1 of the first communication device 40B and the second wireless communicator WC2 of the second communication device 42B via a wired communication channel. The second controller 42A is configured to establish the wireless communication channel between the first communication device 40B and the second communication device 42B via the wired communication channel.

In this embodiment, the first controller 40A is configured to establish, in response to a user input U3, the wireless communication channel between the first wireless communicator WC1 of the first communication device 40B and the second wireless communicator WC2 of the second communication device 42B via the wired communication channel. The second controller 42A is configured to establish the wireless communication channel between the first communication device 40B and the second communication device 42B via the wired communication channel in response to the user input U3.

The user input U3 includes a first user pairing input U31 and a second user pairing input U32. The control apparatus 40 includes a first pairing switch SW31 configured to receive the first user pairing input U31. The additional control apparatus 42 includes a second pairing switch SW32 configured to receive the second user pairing input U32. The first pairing switch SW31 is electrically connected to the first controller 40A. The second pairing switch SW32 is electrically connected to the second controller 42A.

The wired communication channel is established between the first communication device 40B and the second communication device 42B through the electric cable 44 and the first communication port 40C. The wired communication channel is established between the first communication device 40B and the second communication device 42B through the electric cable 44, the first communication port 40C, and the second communication port 42C.

The first controller 40A is configured to communicate with another controller through the first communication port 40C. The first controller 40A is configured to be electrically connected to the first communication port 40C. The first controller 40A is configured to establish the wired communication between the first controller 40A and another controller through the first communication port 40C.

The second controller 42A is configured to communicate with another controller through the second communication port 42C. The second controller 42A is configured to be electrically connected to the second communication port 42C. The second controller 42A is configured to establish the wired communication between the second controller 42A and another controller through the second communication port 42C.

In this embodiment, the wired communication channel is established using power line communication (PLC) technology. More specifically, the electric cable 44 includes a ground line and a voltage line. The PLC technology is used for communicating between electric components. The PLC carries data on a conductor that is also used simultaneously for electric power transmission or electric power distribution to the electric components. In this embodiment, electricity is supplied from the first electric power source 40E and the second electric power source 42E through the electric cable 44 connected to the first communication port 40C and the second communication port 42C. Furthermore, the first controller 40A and the second controller 42A can receive signals from each other through the electric cable 44 using the PLC.

The PLC uses unique device ID that is assigned to an electric component such as the operating device 12 and the gear changing device 20. In this embodiment, the PLC uses the first information INF1 and the second infot nation INF2 as the unique device ID. However, the PLC can use device ID which are assigned to the first controller 40A and the second controller 42A and are distinguishable from the device ID of each of the first wireless communicator WC1 and the second wireless communicator WC2.

Based on the unique device ID, each of the first controller 40A and the second controller 42A is configured to recognize signals which are necessary for itself among signals transmitted via the electric cable 44. For example, the first controller 40A is configured to generate signals including the first information INF1 indicating the first wireless communicator WC1 and the operating device 12. The second controller 42A is configured to generate signals including the second information INF2 indicating the second wireless communicator WC2 and the gear changing device 20. The first controller 40A is configured to recognize signals including the second information INF2 as signals transmitted from the second controller 42A via the electric cable 44. The second controller 42A is configured to recognize signals including the first information INF1 as signals transmitted from the first controller 40A via the electric cable 44.

In this embodiment, the first controller 40A includes a first wired communicator 40W. The first wired communicator 40W is configured to separate input signals to a power source voltage and signals such as signals including the second information INF2. The first wired communicator 40W is configured to regulate the power source voltage to a level at which the control apparatus 40 can properly operate. The first wired communicator 40W is further configured to superimpose output signals such as signals including the first information INF1 on the power source voltage applied to the electric cable 44 from the first electric power source 40E.

The second controller 42A includes a second wired communicator 42W. The second wired communicator 42W is configured to separate input signals to a power source voltage and signals such as signals including the first information INF1. The second wired communicator 42W is configured to regulate the power source voltage to a level at which the additional control apparatus 42 can properly operate. The second wired communicator 42W is further configured to superimpose output signals such as signals including the second information INF2 on the power source voltage applied to the electric cable 44 from the second electric power source 42E.

The control apparatus 40 further comprises a first detector 40L. The first detector 40L is configured to detect a connection between the electric cable 44 and the first communication port 40C. In this embodiment, the first detector 40L is configured to detect a mechanical connection between the electric cable 44 and the first communication port 40C. However, the first detector 40L can be configured to detect a mechanical and/or electrical connection between the electric cable 44 and the first communication port 40C.

The first controller 40A is configured to transmit signals including the first information INF1 via the first communication port 40C and the electric cable 44 if the first detector 40L detects that the connection between the electric cable 44 and the first communication port 40C in a wired-connection state where the electric cable 44 is connected to the first communication port 40C and second communication port 42C.

The additional control apparatus 42 further comprises a second detector 42L. The second detector 42L is configured to detect a connection between the electric cable 44 and the second communication port 42C. In this embodiment, the second detector 42L is configured to detect a mechanical connection between the electric cable 44 and the second communication port 42C. However, the second detector 42L can be configured to detect a mechanical and/or electrical connection between the electric cable 44 and the second communication port 42C.

The second controller 42A is configured to transmit signals including the second information INF2 via the second communication port 42C and the electric cable 44 if the second detector 42L detects that the connection between the electric cable 44 and the second communication port 42C in the wired-connection state where the electric cable 44 is connected to the first communication port 40C and the second communication port 42C.

The first controller 40A is configured to establish the wireless communication channel via the wired communication channel in response to the user input U3 after the first detector 40L detects the connection between the electric cable 44 and the first communication port 40C. The second controller 42A is configured to establish the wireless communication channel via the wired communication channel in response to the user input U3 after the second detector 42L detects the connection between the electric cable 44 and the second communication port 42C.

In this embodiment, the first controller 40A is configured to transmit the first information INF1 relating to the first wireless communicator WC1 via the wired communication channel. The first controller 40A is configured to transmit the first information INF1 stored in the first memory 40F. The first controller 40A is configured to transmit the first information INF1 via the wired communication channel in response to the first user pairing input U31 after the first detector 40L detects the connection between the electric cable 44 and the first communication port 40C. More specifically, the first controller 40A is configured to transmit a first pairing demand signal CS31 including the first information INF1 via the wired communication channel in response to the first user pairing input U31 after the first detector 40L detects the connection between the electric cable 44 and the first communication port 40C.

The second controller 42A is configured to transmit the second information INF2 relating to the second wireless communicator WC2 via the wired communication channel. The second controller 42A is configured to transmit the second information INF2 stored in the second memory 42F. The second controller 42A is configured to transmit the second information INF2 via the wired communication channel in response to the second user pairing input U32 after the second detector 42L detects the connection between the electric cable 44 and the second communication port 42C. More specifically, the second controller 42A is configured to transmit a second pairing demand signal CS32 including the second information INF2 via the wired communication channel in response to the second user pairing input U32 after the second detector 42L detects the connection between the electric cable 44 and the second communication port 42C.

Figure 5:
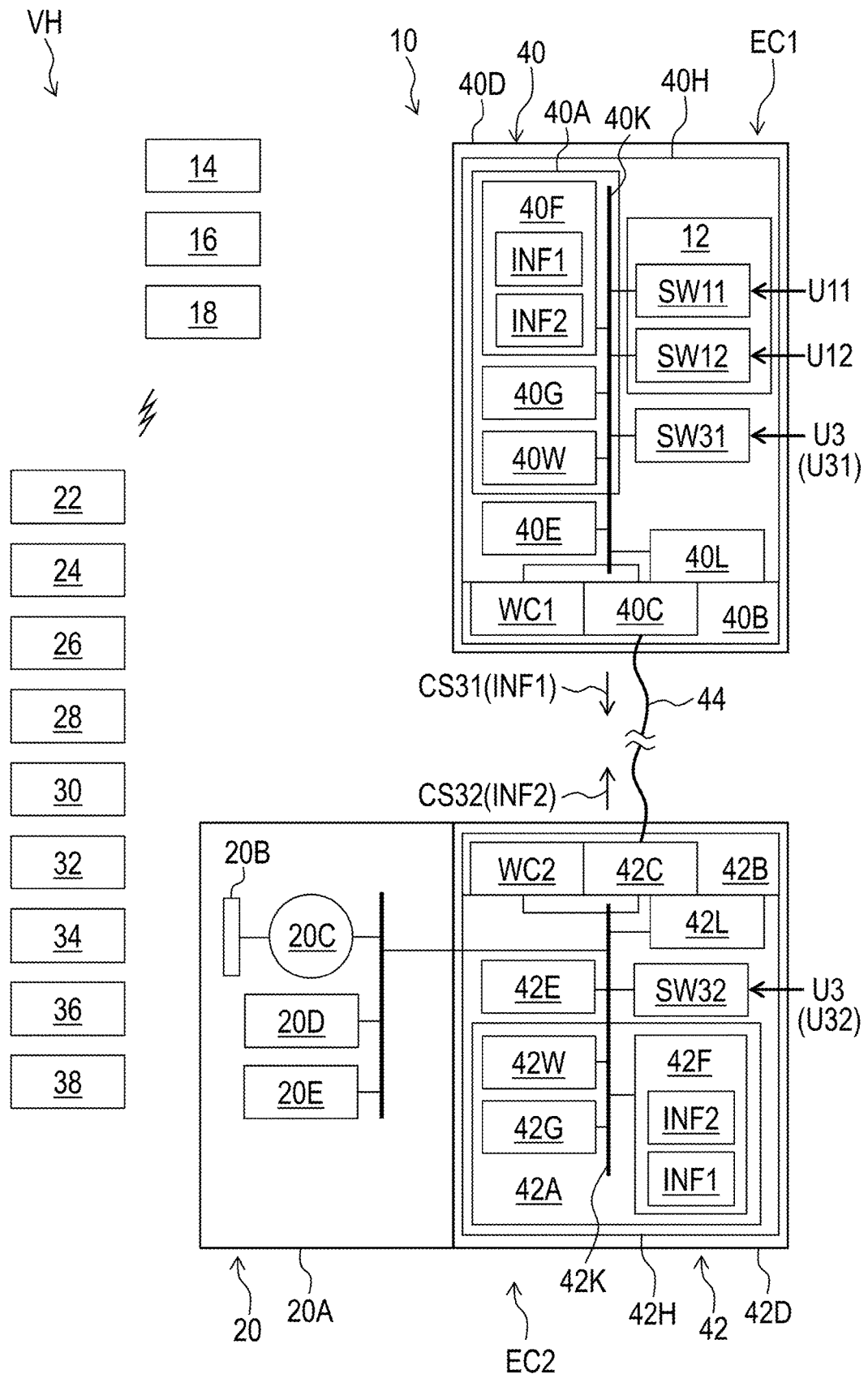
FIG. 5 is a schematic block diagram of the human-powered vehicle illustrated in FIG. 1 (after pairing).

As seen in FIG. 5, the first controller 40A is configured to receive the second information INF2 relating to the second wireless communicator WC2 via the wired communication channel. The first controller 40A is configured to control the first memory 40F to store the second information INF2 if the first controller 40A receives the second information INF2. In this embodiment, the first controller 40A is configured to receive the second pairing demand signal CS32 including the second information INF2 via the wired communication channel. The first controller 40A is configured to receive the second information INF2 via the second communication port 42C, the electric cable 44, and the first communication port 40C. The first controller 40A is configured to control the first memory 40F to store the second information INF2 if the first controller 40A receives the second pairing demand signal CS32 including the second information INF2 via the wired communication channel.

The first memory 40F is configured to store available device ID of each of available paired components. The control apparatus 40 is configured to be paired with each of the available paired components. The first controller 40A is configured to compare device ID included in a pairing demand signal with the available device ID of each of the available paired components if the first controller 40A receives the pairing demand signal. The first controller 40A is configured to control the first memory 40F to store the device ID of the pairing demand signal if the device ID of the pairing demand signal matches the available device ID of one of the available paired components. The first controller 40A is configured to control the first memory 40F not to store the device ID of the pairing demand signal if the device ID of the pairing demand signal does not match the available device ID of any of the available paired components.

In this embodiment, the first controller 40A is configured to compare the second information INF2 included in the second pairing demand signal CS32 with the available device ID of each of the available paired components if the first controller 40A receives the second pairing demand signal CS32. Thus, the first controller 40A is configured to control the first memory 40F to store the second information INF2 as a paired component if the second information INF2 of the second pairing demand signal CS32 matches the available device ID of one of the available paired components.

As seen in FIG. 5, the second controller 42A is configured to receive the first information INF1 relating to the first wireless communicator WC1 via the wired communication channel. The second controller 42A is configured to control the second memory 42F to store the first information INF1 if the second controller 42A receives the first information INF1. In this embodiment, the second controller 42A is configured to receive the first pairing demand signal CS31 including the first information INF1 via the wired communication channel. The second controller 42A is configured to receive the first information INF1 via the first communication port 40C, the electric cable 44, and the second communication port 42C. The second controller 42A is configured to control the second memory 42F to store the first information INF1 if the second controller 42A receives the first pairing demand signal CS31 including the first information INF1 via the wired communication channel.

The second memory 42F is configured to store available device ID of each of available paired components. The additional control apparatus 42 is configured to be paired with each of the available paired components. The second controller 42A is configured to compare device ID included in a pairing demand signal with the available device ID of each of the available paired components if the second controller 42A receives the pairing demand signal. The second controller 42A is configured to control the second memory 42F to store the device ID of the pairing demand signal if the device ID of the pairing demand signal matches the available device ID of one of the available paired components. The second controller 42A is configured to control the second memory 42F not to store the device ID of the pairing demand signal if the device ID of the pairing demand signal does not match the available device ID of any of the available paired components.

In this embodiment, the second controller 42A is configured to compare the first information INF1 included in the first pairing demand signal CS31 with the available device ID of each of the available paired components if the second controller 42A receives the first pairing demand signal CS31. Thus, the second controller 42A is configured to control the second memory 42F to store the first information INF1 as a paired component if the first information INF1 of the first pairing demand signal CS31 matches the available device ID of one of the available paired components.

Thus, the first controller 40A is configured to execute the pairing between the first wireless communicator WC1 and the second wireless communicator WC2 via the wired communication channel in response to the first user pairing input U31 after the first detector 40L detects the connection between the electric cable 44 and the first communication port 40C. The second controller 42A is configured to execute pairing between the first wireless communicator WC1 and the second wireless communicator WC2 via the wired communication channel in response to the second user pairing input U32 after the second detector 42L detects the connection between the electric cable 44 and the second communication port 42C.

However, the first controller 40A can be configured to establish the wireless communication channel via the wired communication channel in a case where the first detector 40L detects the connection between the electric cable 44 and the first communication port 40C after receipt of the user input. Furthermore, the first controller 40A can be configured to automatically establish the wireless communication channel via the wired communication channel in a case where the first detector 40L detects the connection between the electric cable 44 and the first communication port 40C without receipt of the user input. The second controller 42A can be configured to establish the wireless communication channel via the wired communication channel in a case where the second detector 42L detects the connection between the electric cable 44 and the second communication port 42C after receipt of the user input. Furthermore, the second controller 42A can be configured to automatically establish the wireless communication channel via the wired communication channel in a case where the second detector 42L detects the connection between the electric cable 44 and the second communication port 42C without receipt of the user input.

As seen in FIG. 3, after the first wireless communicator WC1 and the second wireless communicator WC2 establish the wireless communication channel via the wired communication channel, the gear changing device 20 operates in response to the user operation input U11 and the user operation input U12 received by the operating device 12.

In this embodiment, the first controller 40A is configured to control the first wireless communicator WC1 to wirelessly transmit a control signal CS to the second wireless communicator WC2 via the wireless communication channel. The second controller 42A is configured to control the second wireless communicator WC2 to receive the control signal CS via the wireless communication channel. The control signal CS includes a command to control the actuator 20C to move the movable member 20B.

The control signal CS includes information relating to at least one of the first wireless communicator WC1 and the second wireless communicator WC2. In this embodiment, the control signal CS includes information relating to the first wireless communicator WC1. The control signal CS includes the first information INF1 relating to the first wireless communicator WC1. The control signal CS includes the first information INF1 including the device ID assigned to the first wireless communicator WC1. The second wireless communicator WC2 and the second controller 42A are configured to recognize that the control signal CS is transmitted from the first wireless communicator WC1. However, the control signal CS can include information relating to the second wireless communicator WC2. In such embodiment, the control signal CS includes the second information INF2 relating to the second wireless communicator WC2. The control signal CS includes the second information INF2 including the device ID assigned to the second wireless communicator WC2. The second wireless communicator WC2 and the second controller 42A are configured to recognize that the control signal CS is transmitted from the first wireless communicator WC1 which has been paired with the second wireless communicator WC2.

The first controller 40A is configured to control the first wireless communicator WC1 to wirelessly transmit a control signal CS11 to the second wireless communicator WC2 via the wireless communication channel in response to the user operation input U11 received by the electrical switch SW11. The first controller 40A is configured to control the first wireless communicator WC1 to wirelessly transmit a control signal CS12 to the second wireless communicator WC2 via the wireless communication channel in response to the user operation input U12 received by the electrical switch SW12.

The second controller 42A is configured to generate a control command CC11 based on the control signal CS11 received by the second wireless communicator WC2 via the wireless communication channel. The second controller 42A is configured to generate a control command CC12 based on the control signal CS12 received by the second wireless communicator WC2 via the wireless communication channel. In this embodiment, the control signal CS11 and the control command CC11 indicate upshifting of the gear changing device 20. The control signal CS12 and the control command CC12 indicate downshifting of the gear changing device 20.

The gear changing device 20 is configured to upshift in response to the control command CC11. The gear changing device 20 is configured to downshift in response to the control command CC12. More specifically, the gear changing device 20 includes a position sensor 20D and an actuator driver 20E. The actuator driver 20E is electrically connected to the actuator 20C to control the actuator 20C based on the control command CC11 and the control command CC12 generated by the second controller 42A. The position sensor 20D and the actuator driver 20E are electrically connected to the second system bus 42K. Examples of the actuator 20C include a direct-current (DC) motor and a stepper motor. The actuator 20C includes a rotational shaft operatively coupled to the movable member 20B. The position sensor 20D is configured to sense a current gear position of the gear changing device 20. Examples of the position sensor 20D include a potentiometer and a rotary encoder. The position sensor 20D is configured to sense an absolute rotational position of the rotational shaft of the actuator 20C as the current gear position of the gear changing device 20. The actuator 20C and the position sensor 20D are electrically connected to the actuator driver 20E.

The actuator driver 20E is configured to control the actuator 20C to move the movable member 20B relative to the base member 20A by one gear position in a downshift direction based on the control command CC11 and the current gear position sensed by the position sensor 20D. The actuator driver 20E is configured to control the actuator 20C to move the movable member 20B relative to the base member 20A by one gear position in an upshift direction based on the control command CC12 and the current gear position sensed by the position sensor 20D.

The pairing between the control apparatus 40 and the additional control apparatus 42 will be described below referring FIG. 6.

Figure 6:
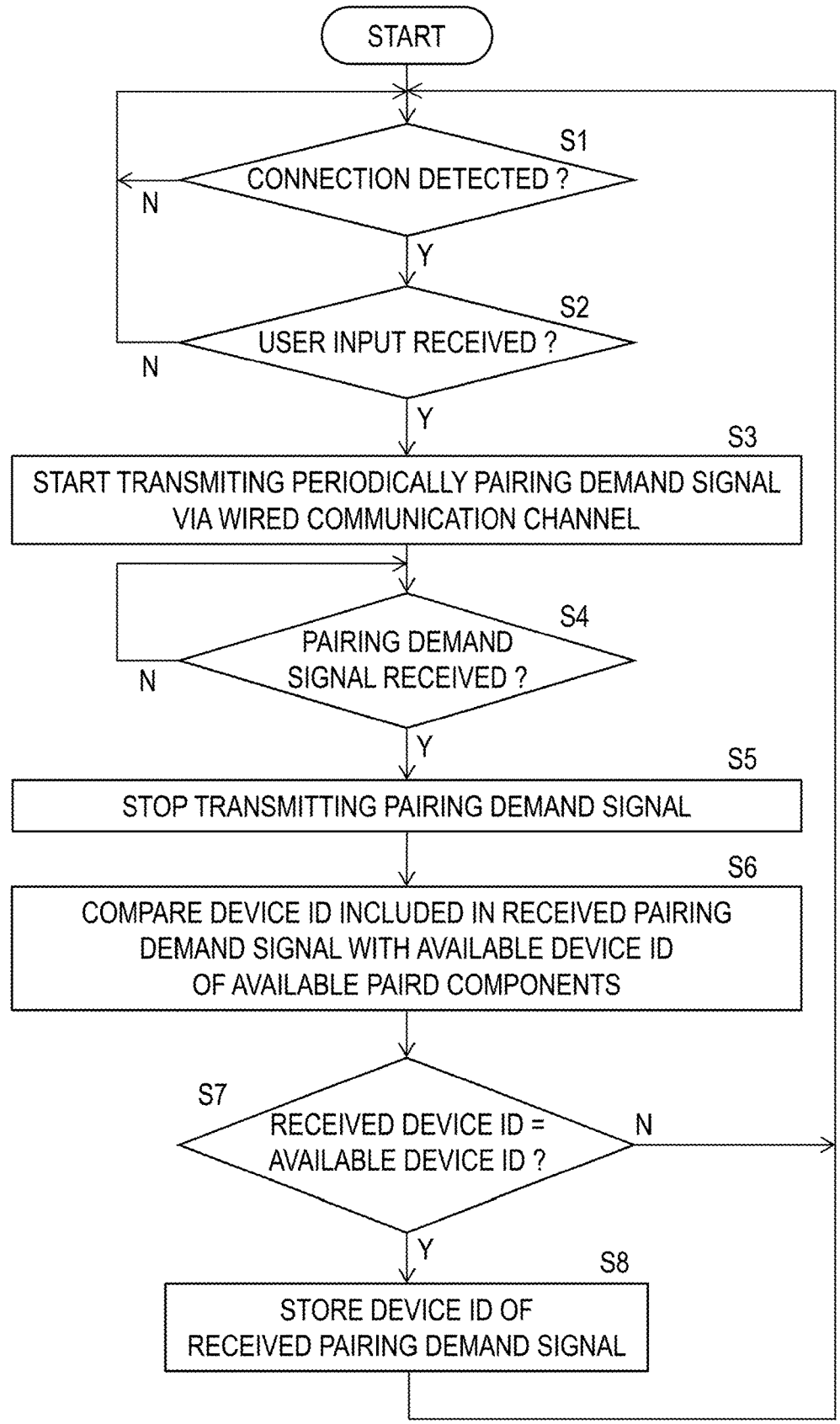
FIG. 6 is a flow chart of the control system of the human-powered vehicle illustrated in FIG. 1.

As seen in FIG. 6, the first detector 40L of the control apparatus 40 determines whether the electric cable 44 is connected to the first communication port 40C (Step S1). The first controller 40A determines whether the operating device 12 receives the user input U3 if the first detector 40L detects the connection between the electric cable 44 and the first communication port 40C (Step S2). In this embodiment, the first controller 40A determines whether the first pairing switch SW31 of the operating device 12 receives the first user pairing input U31 if the first detector 40L detects the connection between the electric cable 44 and the first communication port 40C (Step S2).

The first controller 40A starts transmitting periodically the first pairing demand signal CS31 via the wired communication channel constituted by the first communication port 40C, the electric cable 44, and the second communication port 42C (Step S3). If the electric cable 44 is not connected to the second communication port 42C, the wired communication channel is not established between the control apparatus 40 and the additional control apparatus 42. Thus, the first pairing demand signal CS31 is not transmitted from the first controller 40A to the additional control apparatus 42. The first pairing demand signal CS31 is transmitted from the first controller 40A to the additional control apparatus 42 via the wired communication channel constituted by the first communication port 40C, the electric cable 44, and the second communication port 42C.

The first controller 40A determines whether the first controller 40A receives a pairing demand signal (e.g., the second pairing demand signal CS32) via the wired communication channel (Step S4). The first controller 40A stops transmitting the first pairing demand signal CS31 if the first controller 40A concludes that the first controller 40A receives the pairing demand signal (e.g., the second pairing demand signal CS32) via the wired communication channel (Step S5). The first controller 40A compares device ID included in the received pairing demand signal (e.g., the second pairing demand signal CS32) with the available device ID of the available paired components (Step S6). The first controller 40A controls the first memory 40F to store the device ID of the received pairing demand signal (the device ID included in the second pairing demand signal CS32) if the device ID of the received pairing demand signal matches the available device ID of the available paired components (Steps S7 and S8). Thus, the first controller 40A returns the process to Step S1. The first controller 40A returns the process to Step S1 without storing the device ID of the received pairing demand signal if the device ID of the received pairing demand signal does not match the available device ID of the available paired components (Step S7).

As with the first controller 40A, the second detector 42L of the additional control apparatus 42 determines whether the electric cable 44 is connected to the second communication port 42C (Step S1). The second controller 42A determines whether the operating device 12 receives the user input U3 if the second detector 42L detects the connection between the electric cable 44 and the second communication port 42C (Step S2). In this embodiment, the second controller 42A determines whether the first pairing switch SW31 of the operating device 12 receives the second user pairing input U32 if the second detector 42L detects the connection between the electric cable 44 and the second communication port 42C (Step S2).

The second controller 42A starts transmitting periodically the second pairing demand signal CS32 via the wired communication channel constituted by the second communication port 42C, the electric cable 44, and the first communication port 40C (Step S3). If the electric cable 44 is not connected to the first communication port 40C, the wired communication channel is not established between the additional control apparatus 42 and the control apparatus 40. Thus, the second pairing demand signal CS32 is not transmitted from the second controller 42A to the control apparatus 40. The second pairing demand signal CS32 is transmitted from the second controller 42A to the control apparatus 40 via the wired communication channel constituted by the second communication port 42C, the electric cable 44, and the first communication port 40C.

The second controller 42A determines whether the second controller 42A receives a pairing demand signal (e.g., the second pairing demand signal CS32) via the wired communication channel (Step S4). The second controller 42A stops transmitting the second pairing demand signal CS32 if the second controller 42A concludes that the second controller 42A receives the pairing demand signal (e.g., the second pairing demand signal CS32) via the wired communication channel (Step S5). The second controller 42A compares device ID included in the received pairing demand signal (e.g., the second pairing demand signal CS32) with the available device ID of the available paired components (Step S6). The second controller 42A controls the first memory 40F to store the device ID of the received pairing demand signal (the device ID included in the second pairing demand signal CS32) if the device ID of the received pairing demand signal matches the available device ID of the available paired components (Steps S7 and S8). Thus, the second controller 42A returns the process to Step S1. The second controller 42A returns the process to Step S1 without storing the device ID of the received pairing demand signal if the device ID of the received pairing demand signal does not match the available device ID of the available paired components (Step S7).

Second Embodiment

A control system 210 in accordance with a second embodiment will be described below referring to FIG. 7 The control system 210 has the same structure and/or configuration as those of the control system 10 except for the arrangement of the control apparatus 40 and the additional control apparatus 42. Thus, elements having substantially the same function as those in the first embodiment will be numbered the same here and will not be described and/or illustrated again in detail here for the sake of brevity.

Figure 7:
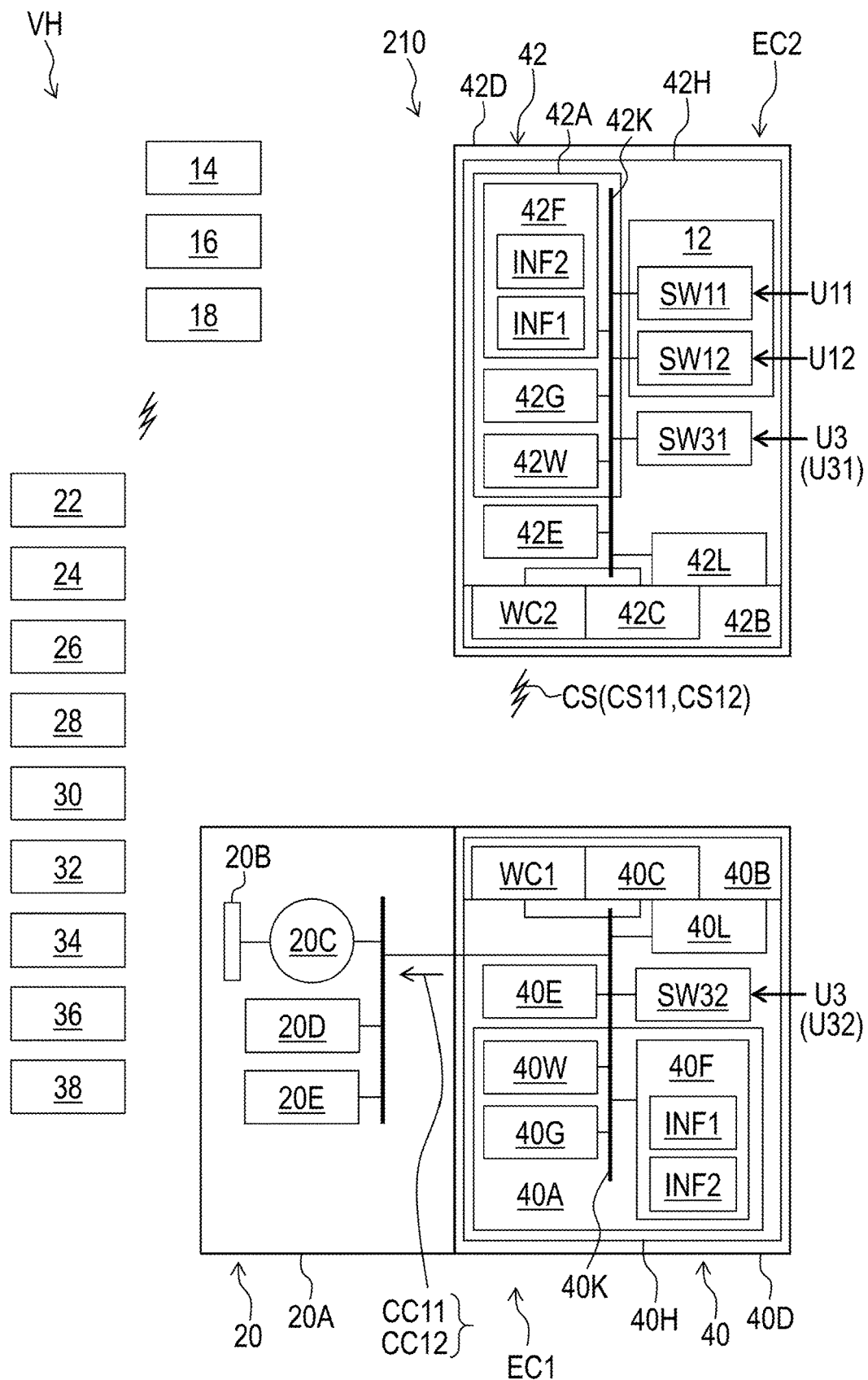
FIG. 7 is a schematic block diagram of the human-powered vehicle including a control system in accordance with a second embodiment.

As seen in FIG. 7, the control system 210 for the human-powered vehicle VH comprises the control apparatus 40 and the additional control apparatus 42. The electric component EC1 for the human-powered vehicle VH comprises one of the operating device 12, 14, 16 and/or 18, the gear changing device 20, the braking device 22 and/or 24, the suspension 26 and/or 28, the adjustable seatpost 30, the auxiliary drive device 32, the lighting device 34, the imaging device 36, and the notification device 38. The additional electric component EC2 for the human-powered vehicle VH comprises another of the operating device 12, 14, 16 and/or 18, the gear changing device 20, the braking device 22 and/or 24, the suspension 26 and/or 28, the adjustable seatpost 30, the auxiliary drive device 32, the lighting device 34, the imaging device 36, and the notification device 38. In this embodiment, the electric component EC1 comprises the gear changing device 20 and the control apparatus 40. The additional electric component EC2 comprises the operating device 12 and the additional control apparatus 42.

In this embodiment, the second controller 42A is configured to control the second wireless communicator WC2 to wirelessly transmit the control signal CS to the first wireless communicator WC1 via the wireless communication channel. The first wireless communicator WC1 is configured to wirelessly receive the control signal CS from the second wireless communicator WC2 via the wireless communication channel. The control signal CS includes the command to control the actuator 20C to move the movable member 20B.

The control signal CS includes information relating to at least one of the first wireless communicator WC1 and the second wireless communicator WC2. In this embodiment, the control signal CS includes information relating to the second wireless communicator WC2. The control signal CS includes the second information INF2 relating to the second wireless communicator WC2. The control signal CS includes the second information INF2 including the device ID assigned to the second wireless communicator WC2. The first wireless communicator WC1 and the first controller 40A are configured to recognize that the control signal CS is transmitted from the second wireless communicator WC2. However, the control signal CS can include information relating to the first wireless communicator WC1. In such embodiment, the control signal CS includes the first information INF1 relating to the first wireless communicator WC1. The control signal CS includes the first information INF1 including the device ID assigned to the first wireless communicator WC1. The first wireless communicator WC1 and the first controller 40A are configured to recognize that the control signal CS is transmitted from the second wireless communicator WC2 which has been paired with the first wireless communicator WC1.

Third Embodiment

A control system 310 in accordance with a third embodiment will be described below referring to FIG. 8 The control system 310 has the same structure and/or configuration as those of the control system 10 except for the control apparatus 40 and the additional control apparatus 42. Thus, elements having substantially the same function as those in the above embodiments will be numbered the same here and will not be described and/or illustrated again in detail here for the sake of brevity.

Figure 8:
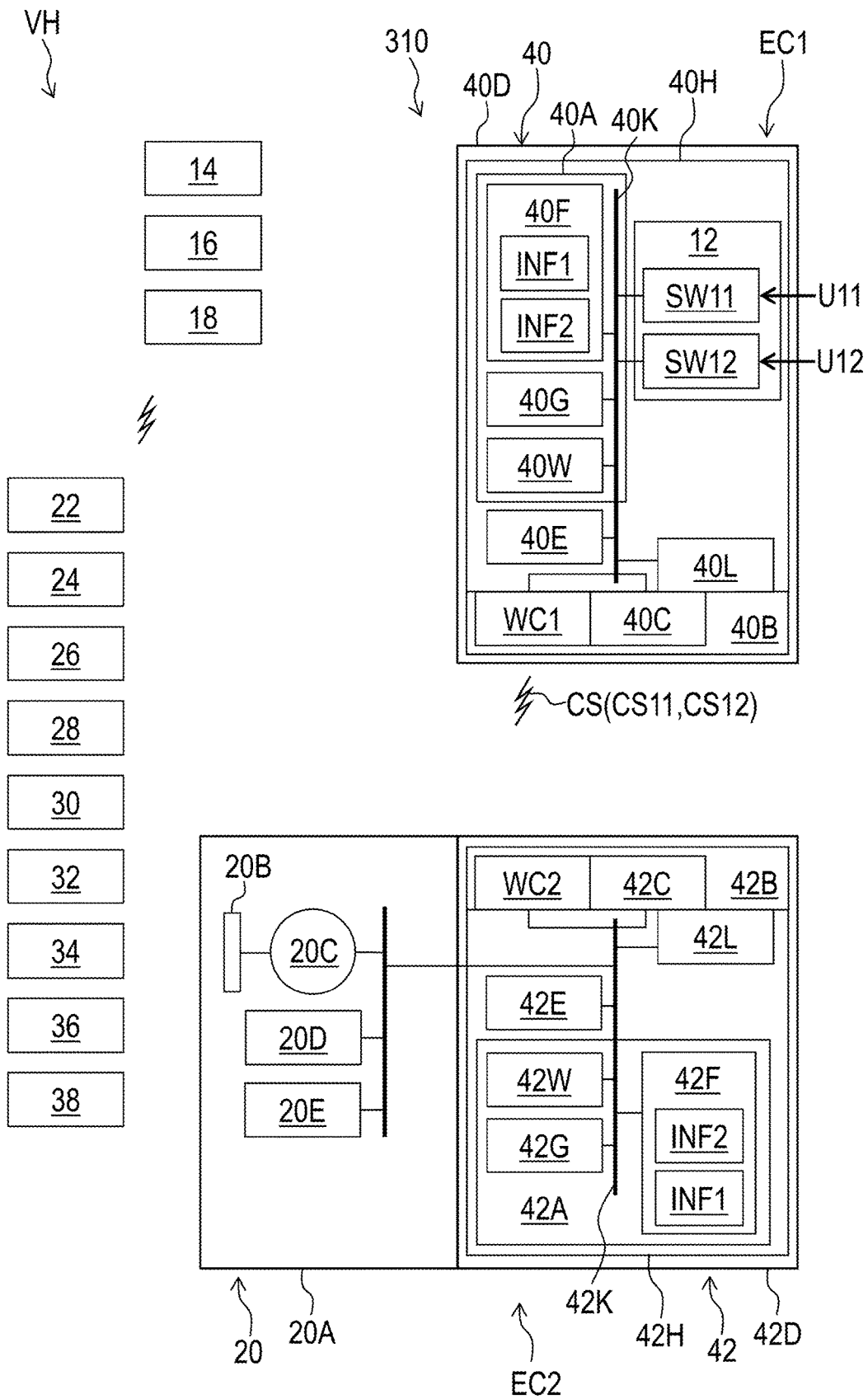
FIG. 8 is a schematic block diagram of the human-powered vehicle including a control system in accordance with a third embodiment.

As seen in FIG. 8, the control system 210 for the human-powered vehicle VH comprises a control apparatus 340 and an additional control apparatus 342. The control apparatus 340 has substantially the same structure as the structure of the control apparatus 40 of the first embodiment. The additional control apparatus 342 has substantially the same structure as the structure of the additional control apparatus 42 of the first embodiment.

In this embodiment, the control apparatus 340 does not include the first pairing switch SW31. The additional control apparatus 342 does not include the second pairing switch SW32.

Figure 9:
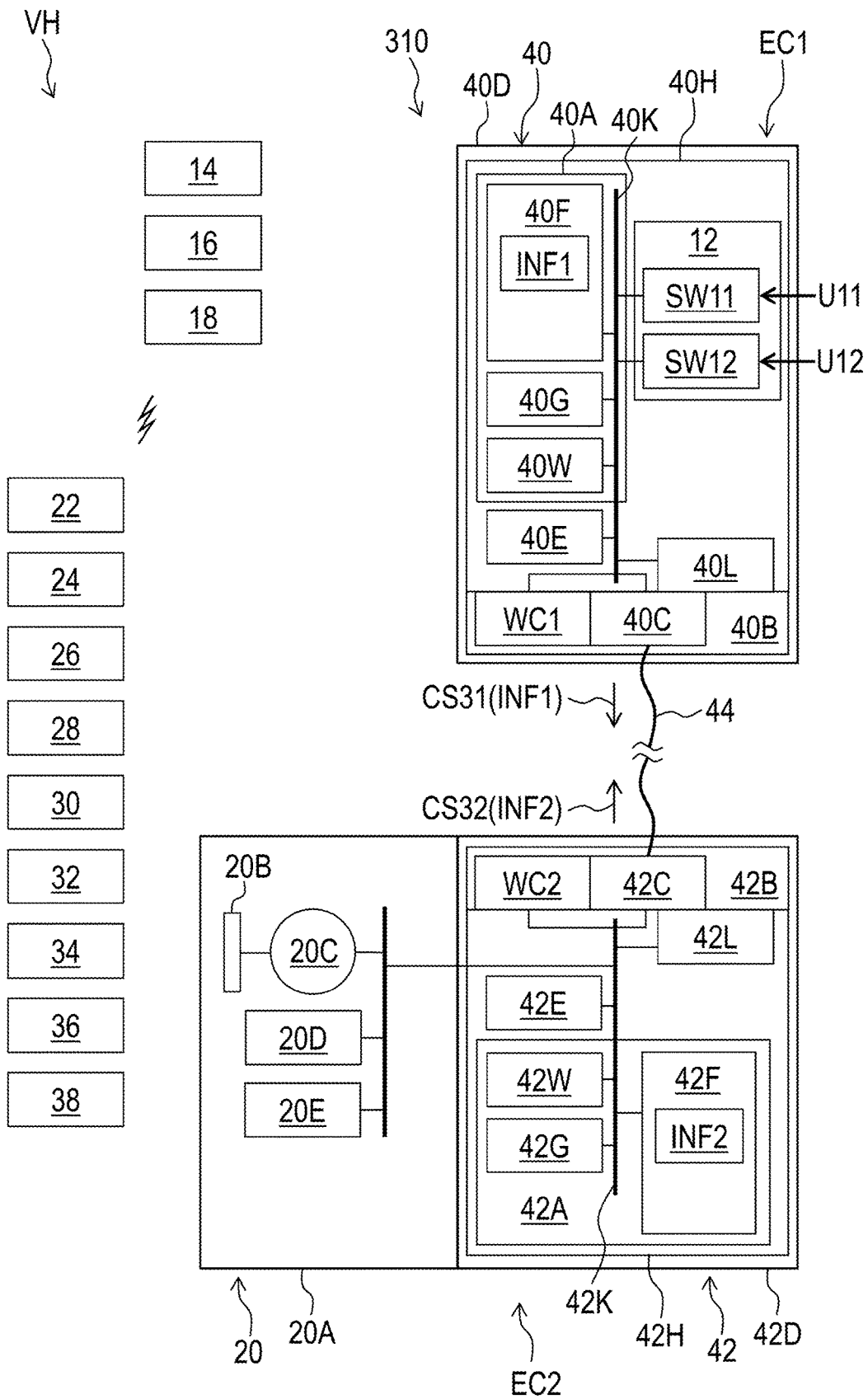
FIG. 9 is a schematic block diagram of the human-powered vehicle illustrated in FIG. 8 (during pairing).

As seen in FIG. 9, the control apparatus 340 for the human-powered vehicle VH comprises a first controller 340A and the first electric power source 40E. The first controller 340A has substantially the same structure as the structure of the first controller 40A. The first controller 340A is configured to establish the wireless communication channel between the first wireless communicator WC1 of the first communication device 40B and the second wireless communicator WC2 of the second communication device 42B via the wired communication channel which is established between the first communication device 40B and the second communication device 42B through the electric cable 44 and the first communication port 40C configured to be connected to the electric cable 44.

Figure 10:
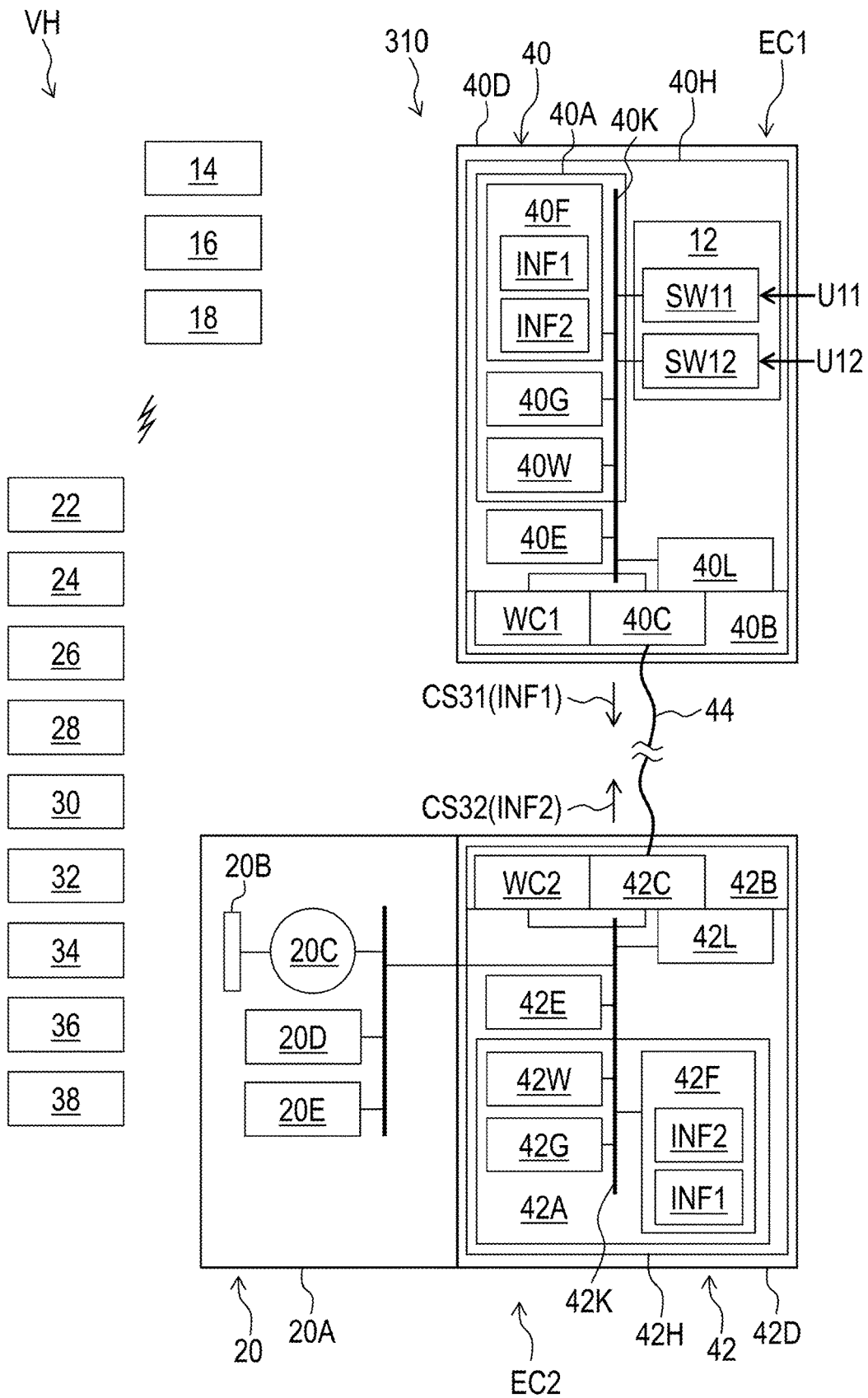
FIG. 10 is a schematic block diagram of the human-powered vehicle illustrated in FIG. 8 (after pairing).
Figure 11:
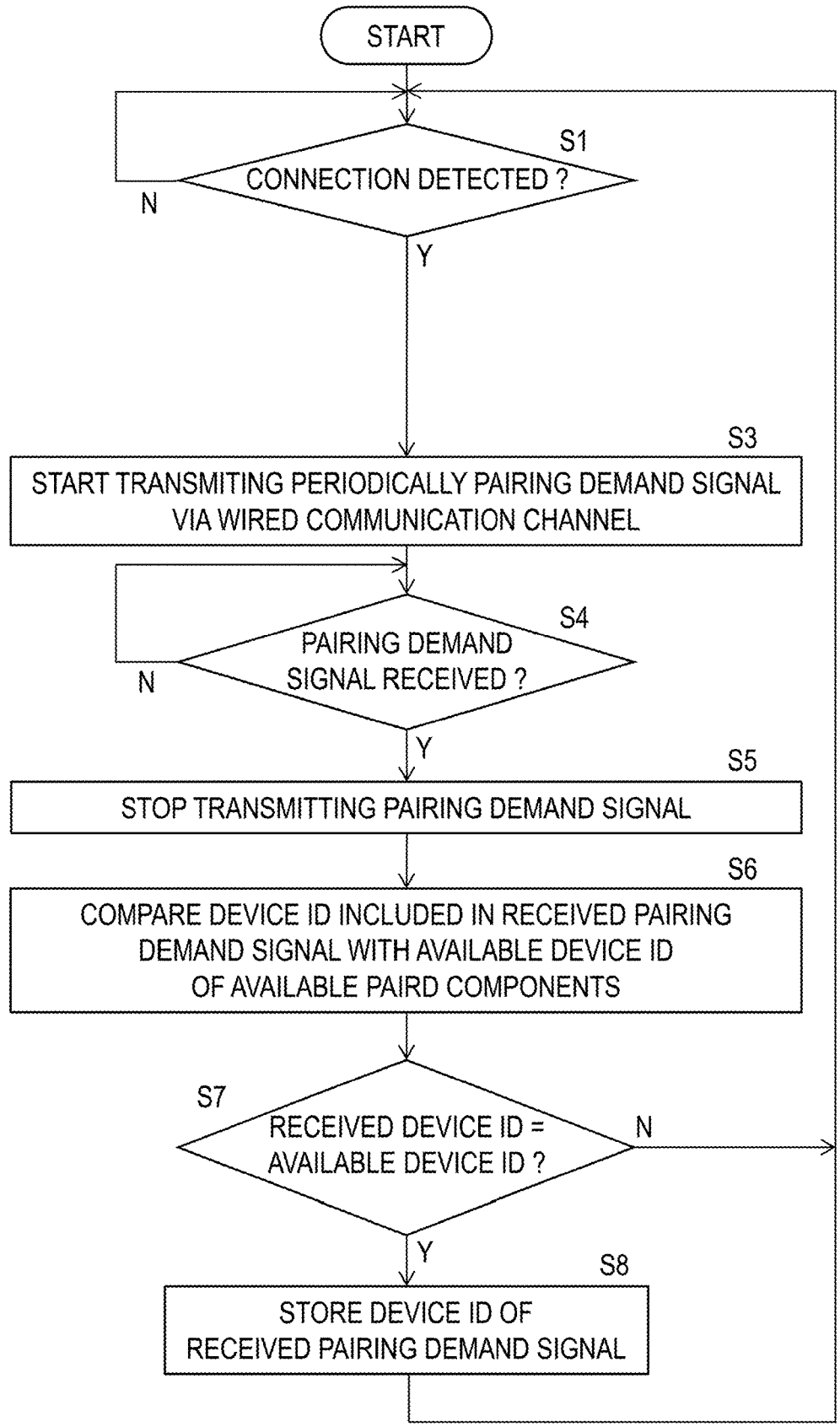
FIG. 11 is a flow chart of the control system of the human-powered vehicle illustrated in FIG. 8.

As seen in FIGS. 9 to 11, in this embodiment, the first controller 340A is configured to establish the wireless communication channel via the wired communication channel in response to a detection result of the first detector 40L that the electric cable 44 is connected to the first communication port 40C. The first controller 340A is configured to automatically establish, without a user input, the wireless communication channel via the wired communication channel in response to the detection result of the first detector 40L that the electric cable 44 is connected to the first communication port 40C.

Modifications

Figure 12:
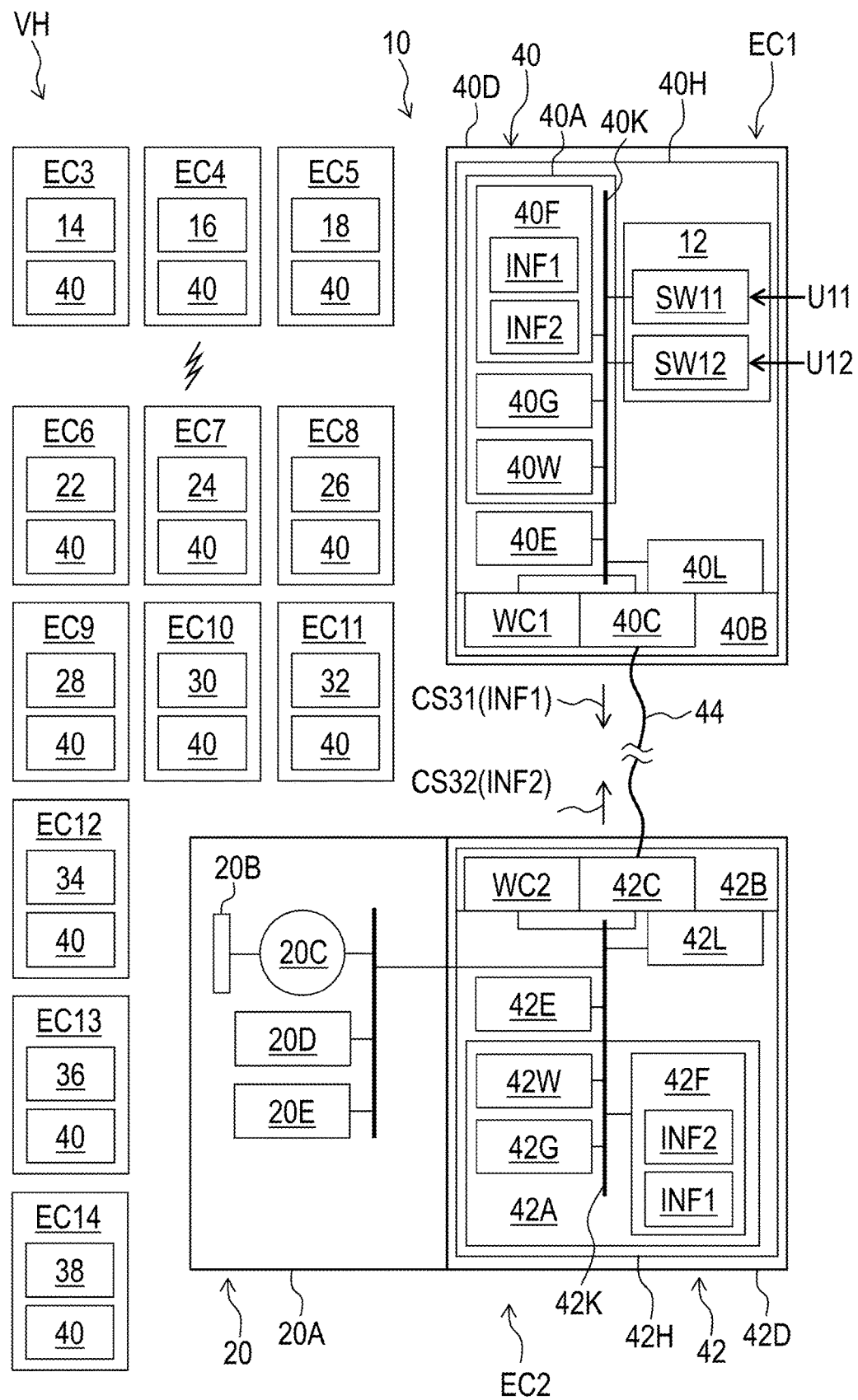
FIG. 12 is a schematic block diagram of the human-powered vehicle including a control system in accordance with a modification.

In the first to third embodiments, the control apparatus 40 is arranged on one of the operating device 12 and the gear changing device 20, and the additional control apparatus 42 is arranged on the other of the operating device 12 and the gear changing device 20. As seen in FIG. 12, however, the control apparatus 40 can be arranged on at least one of other components instead of or in addition to the operating device 12 and/or the gear changing device 20. The additional control apparatus 42 can be arranged on at least one of other components instead of or in addition to the operating device 12 and/or the gear changing device 20. In such modifications, an electric component EC3 comprises the operating device 14 and the control apparatus 40. An electric component EC4 comprises the operating device 16 and the control apparatus 40. An electric component EC5 comprises the operating device 18 and the control apparatus 40. An additional electric component EC6 comprises the braking device 22 and the additional control apparatus 42. An additional electric component EC7 comprises the braking device 24 and the additional control apparatus 42. An additional electric component EC8 comprises the suspension 26 and the additional control apparatus 42. An additional electric component EC9 comprises the suspension 28 and the additional control apparatus 42. An additional electric component EC10 comprises the adjustable seatpost 30 and the additional control apparatus 42. An additional electric component EC11 comprises the auxiliary drive device 32 and the additional control apparatus 42. An additional electric component EC12 comprises the lighting device 34 and the additional control apparatus 42. An additional electric component EC12 comprises the imaging device 36 and the additional control apparatus 42. An electric component EC5 comprises the notification device 38 and the control apparatus 40.

In the first to third embodiments, the first controller 40A is configured to execute the wired pairing using electricity supplied from the first electric power source 40E. However, the first controller 40A can be configured to execute the wired pairing using electricity supplied from another electric power source. Similarly, the second controller 42A is configured to execute the wired pairing using electricity supplied from the second electric power source 42E. However, the second controller 42A can be configured to execute the wired pairing using electricity supplied from another electric power source.

In the first to third embodiments, the wired communication channel is established using the PLC technology. However, the wired communication channel can be established using other technology such as a mere signal line.

In the first to third embodiments, the control apparatus 40 of the electric component EC1 is configured to establish the wired communication channel between the control apparatus 40 and the additional control apparatus 42 of the additional electric component EC2. However, the control apparatus 40 of the electric component EC1 can be configured to establish a wired communication channel between the control apparatus 40 and the additional control apparatus 42 of another additional electric component (e.g., EC6 to EC13 illustrated in FIG. 12) instead of or in addition to the additional control apparatus 42 of the additional electric component EC2.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for a human-powered vehicle, comprising:
    a first controller configured to establish, in response to a user input, a wireless communication channel between a first wireless communicator of a first communication device and a second wireless communicator of a second communication device via a wired communication channel which is established between the first communication device and the second communication device through an electric cable and a first communication port configured to be connected to the electric cable.

2. A control apparatus for a human-powered vehicle, comprising
    a first controller configured to establish, in response to a user input, a wireless communication channel between a first wireless communicator of a first communication device and a second wireless communicator of a second communication device via a wired communication channel which is established between the first communication device and the second communication device through an electric cable and a first communication port configured to be connected to the electric cable; and
    a first electric power source configured to be detachably connected to the first controller, the first electric power source being configured to supply electricity to the first controller.

3. The control apparatus according to claim 1, further comprising
    a first detector configured to detect a connection between the electric cable and the first communication port, wherein
    the first controller is configured to establish the wireless communication channel via the wired communication channel in response to the user input after the first detector detects the connection between the electric cable and the first communication port.

4. A control apparatus for a human-powered vehicle, comprising:
    a first controller configured to establish a wireless communication channel between a first wireless communicator of a first communication device and a second wireless communicator of a second communication device via a wired communication channel which is established between the first communication device and the second communication device through an electric cable and a first communication port configured to be connected to the electric cable; and
    a first electric power source configured to be detachably connected to the first controller, the first electric power source being configured to supply electricity to the first controller.

5. The control apparatus according to claim 4, further comprising
    a first detector configured to detect a connection between the electric cable and the first communication port, wherein
    the first controller is configured to establish the wireless communication channel via the wired communication channel in response to a detection result of the first detector that the electric cable is connected to the first communication port.

6. The control apparatus according to claim 1, wherein
    the first controller is configured to transmit first information relating to the first wireless communicator via the wired communication channel.

7. The control apparatus according to claim 6, wherein
    the first controller includes a first memory configured to store the first information, and
    the first controller is configured to transmit the first information stored in the first memory.

8. The control apparatus according to claim 7, wherein
    the first controller is configured to receive second information relating to the second wireless communicator via the wired communication channel, and
    the first controller is configured to control the first memory to store the second information if the first controller receives the second information.

9. The control apparatus according to claim 1, wherein
    the first controller is configured to control the first wireless communicator to wirelessly transmit a control signal to the second wireless communicator via the wireless communication channel, and
    the control signal includes a command to control an actuator to move a movable member.

10. The control apparatus according to claim 1, wherein
    the first wireless communicator is configured to wirelessly receive a control signal from the second wireless communicator via the wireless communication channel, and
    the control signal includes a command to control an actuator to move a movable member.

11. The control apparatus according to claim 9, wherein
    the control signal includes information relating to at least one of the first wireless communicator and the second wireless communicator.

12. The control apparatus according to claim 1, further comprising:
    the first communication device including the first wireless communicator and the first communication port; and
    a first housing, wherein
    the first controller and the first communication device are configured to be arranged in the first housing.

13. A control system for a human-powered vehicle, comprising:
    the control apparatus according to claim 1; and
    an additional control apparatus including the second communication device, the second communication device including the second wireless communicator and a second communication port configured to be connected to the electric cable,
    the additional control apparatus including a second controller configured to establish the wireless communication channel between the first communication device and the second communication device via the wired communication channel in response to the user input.

14. The control system according to claim 13, wherein
    the additional control apparatus comprises a second electric power source configured to be detachably connected to the second controller, and
    the second electric power source is configured to supply electricity to the second controller.

15. The control system according to claim 13, wherein
    the second controller is configured to transmit second information relating to the second wireless communicator via the wired communication channel.

16. The control system according to claim 15, wherein
    the second controller includes a second memory configured to store the second information, wherein the second controller is configured to transmit the second information stored in the second memory.

17. The control system according to claim 16, wherein
the second controller is configured to receive the first information relating to the first wireless communicator via the wired communication channel, and
the second controller is configured to control the second memory to store the first information if the second controller receives the first information.

18. The control system according to claim 13, wherein
the additional control apparatus includes the second communication device and a second housing, and
the second controller and the second communication device are configured to be arranged in the second housing.

19. The control system according to claim 13, wherein
the first controller is configured to control the first wireless communicator to wirelessly transmit a control signal to the second wireless communicator via the wireless communication channel,
the second controller is configured to control the second wireless communicator to receive the control signal via the wireless communication channel, and
the control signal includes a command to control an actuator to move a movable member.

20. An electric component for a human-powered vehicle, comprising:
one of an operating device, a gear changing device, a braking device, a suspension, an adjustable seatpost, an auxiliary drive device, a lighting device, an imaging device, and a notification device; and
the control apparatus according to claim 1, the control apparatus being arranged on the one of the operating device, the gear changing device, the braking device, the suspension, the adjustable seatpost, the auxiliary drive device, the lighting device, the imaging device, and the notification device.

21. The control system according to claim 1, wherein
the first controller is configured to establish, in response to the user input, the wireless communication channel between the first wireless communicator of the first communication device and the second wireless communicator of the second communication device in a state where the first wireless communicator of the first communication device and the second wireless communicator of the second communication device are electrically connected through the electric cable and the first communication port.

* * * * *